(12) United States Patent
Wiser et al.

(10) Patent No.: US 8,862,552 B2
(45) Date of Patent: Oct. 14, 2014

(54) REVERSE AUDIT SYSTEM

(75) Inventors: Daniel Allen Wiser, Hurst, TX (US); Shawn Glenn Rucker, San Francisco, CA (US)

(73) Assignee: Lanyon, Inc., Irving, TX (US)

( * ) Notice: Subject to any disclaimer, the term of this patent is extended or adjusted under 35 U.S.C. 154(b) by 501 days.

(21) Appl. No.: 12/907,369

(22) Filed: Oct. 19, 2010

(65) Prior Publication Data

US 2012/0096021 A1    Apr. 19, 2012

(51) Int. Cl.
*G06F 7/00* (2006.01)
*G06Q 10/08* (2012.01)

(52) U.S. Cl.
CPC .................................. *G06Q 10/087* (2013.01)
USPC ....................................................... 707/648

(58) Field of Classification Search
USPC ....................................................... 707/648
See application file for complete search history.

(56) References Cited

U.S. PATENT DOCUMENTS

| | | | |
|---|---|---|---|
| 5,948,040 | A | 9/1999 | DeLorme et al. |
| 7,195,157 | B2 | 3/2007 | Swartz et al. |
| 7,225,249 | B1 | 5/2007 | Barry et al. |
| 7,548,615 | B2 | 6/2009 | Bhalgat et al. |
| 7,962,354 | B2 | 6/2011 | Liew et al. |
| 7,979,457 | B1 | 7/2011 | Garman |
| 2002/0107761 | A1 | 8/2002 | Kark et al. |
| 2002/0152100 | A1 | 10/2002 | Chen et al. |
| 2004/0002876 | A1* | 1/2004 | Sommers et al. ................ 705/6 |
| 2004/0143540 | A1 | 7/2004 | Song |
| 2006/0287954 | A1* | 12/2006 | DeWitt et al. ................ 705/40 |
| 2007/0061174 | A1 | 3/2007 | Phillips |
| 2007/0233528 | A1 | 10/2007 | Jafri et al. |
| 2009/0018996 | A1 | 1/2009 | Hunt et al. |
| 2009/0106170 | A1 | 4/2009 | Thurlow et al. |
| 2009/0240568 | A1 | 9/2009 | Ramer et al. |
| 2010/0145740 | A1* | 6/2010 | Claverie et al. ................ 705/5 |
| 2011/0082758 | A1 | 4/2011 | Wiser et al. |
| 2011/0258064 | A1* | 10/2011 | Agarwal et al. ............. 705/26.1 |

FOREIGN PATENT DOCUMENTS

| WO | WO 00/42543 | 7/2000 |
|---|---|---|
| WO | WO 2011/043770 A1 | 4/2011 |

OTHER PUBLICATIONS

"Synchronizing a Database to Improve Freshness", ACM SIGMOD Record, vol. 29, Issue 2, Jun. 2000, 12 pages.
Notice of Allowance dated Nov. 4, 2011, 29 pages.
PCT International Search Report mailed on Dec. 9, 2009 for PCT/US09/59860, 10 pages.
PCT International Search Report mailed on Dec. 14, 2010 for PCT/US2010/053154.

* cited by examiner

*Primary Examiner* — Apu Mofiz
*Assistant Examiner* — Ajith Jacob
(74) *Attorney, Agent, or Firm* — Hitchcock Evert LLP

(57) ABSTRACT

Embodiments of the present invention provide a system, method, and computer program product for reverse audits based on server access of databases. In one embodiment, a data provider is determined, and a data request based on the data provider is sent to a server, wherein the data request promotes an entry of the data request to access a database. A data response is received from the server, wherein the data response corresponds to the data request. A message is output based on whether the data response includes specific data.

43 Claims, 2 Drawing Sheets

REVERSE AUDIT SYSTEM

FIELD OF THE INVENTION

The present invention generally relates to validation of data which has been entered into an information system and relates to product and service providers. More particularly, the invention relates to a system, method, and computer program product for confirming that data providers have entered data approved by specific customers into a database accessed by a distribution system, thereby reducing occurrences of databases including unapproved data and databases lacking approved data.

BACKGROUND

There are a number of inventory management and distribution systems, or global distribution systems, which have been generally adopted by the various product and service industries as standards for providing rate negotiation and/or distribution services to participating customers. For example, in the travel industry there have been a limited number of primary computer-based global distribution systems, such as, Sabre, Apollo-Galileo, Amadeus, and Worldspan. While variations exist between the major global distribution systems used within the travel industry, the underlying concept is generally the same in that a global distribution system provides travel agents, corporate travel clients, and in some cases, individual customers, with direct access to travel service provider rates and booking tools. The travel and lodging industry has long relied on travel agents (also known as brokers) to direct customers to their services. The Internet has changed the travel industry by providing a direct channel between the travel service providers and the customer. However, travel agents are still utilized in large part by corporate travelers and those preferring the services of a professional travel agent to ensure that their vacation or business travel is planned thoroughly and that they are receiving the lowest possible rates.

In general, a global distribution system (or a related system) in the travel industry provides brokers with information to help negotiate discounts on behalf of their customers and with travel service providers with whom they would like to conduct business. A global distribution system provides a travel service provider a means to attract repeat business from clients in return for a discounted rate. When a rate is negotiated, it may be the responsibility of the travel service provider to enter the rate data into the global distribution system and/or a computer reservation system.

Due to human error, possible computer errors, and various other reasons, rate data is often not entered correctly or is not properly recorded in a database accessed by a global distribution system. As a result, a database may include inaccurate or unapproved data.

SUMMARY OF THE INVENTION

A potential solution to ensure that rate data has been entered and recorded correctly involves the use of "screen-scraping," in which a rate request is sent to a global distribution system in the form of a data screen request that specifies the location (such as the column and the row) in which the rate is expected to be displayed via the global distribution system's data screen. However, if a data screen that displays a rate is modified (such as a change in the row or column where the rate is located), a screen-scraping request may not correctly return the rate. Additionally, some global distribution systems may access data from remote databases, such as remote databases maintained by computer reservation systems, but the data in the global distribution system may lag behind updates made to data in remote databases. Consequently, screen-scraping may not be able to audit rates correctly, and customers may not receive rate data that is updated in remote databases but not updated in a global distribution system. Furthermore, a data provider may load its database with data that implies approval by a specific customer even if the specific customer has not approved the data. For example, if a corporation negotiates with three New York hotels to offer discounted hotel rates to the corporation's employees, the corporation may approve the rate offered by the first two hotels but disapprove of the rate offered by the third hotel based on perceptions that the third hotel's rates are higher than justified by the quality of the hotel's accommodations or any other reason. However, the third hotel may load its database with the unapproved rate linked to an identifier for the corporation, such that rate requests for the corporation's employees may result in accepting the unapproved hotel rates based on the erroneous belief that the employees' corporation approved the hotel rates. Therefore, it is an object of the present invention to provide a system, a method, and a computer program product for facilitating a more accurate and comprehensive computerized scan of a global distribution system database in order to flag unapproved, suspicious, incorrect, and/or missing rate data.

It is an object of the present invention to improve the reliability of data stored by global distribution systems and/or corresponding databases.

It is an object of the present invention to overcome potential problems associated with the need for reverse audits of data in a global distribution system.

It is a further object of the present invention to generate messages and reports based on reverse audits in a manner which will result in a reduction in unapproved data stored in databases accessed by global distribution systems.

It is a further object of the present invention to identify certain product and service providers who repeatedly load unapproved data or fail to load approved data.

It is a further object of the present invention to identify and correct errors in stored data so that corporations may reduce instances of misleading associations.

DETAILED DESCRIPTION

Figure 1:
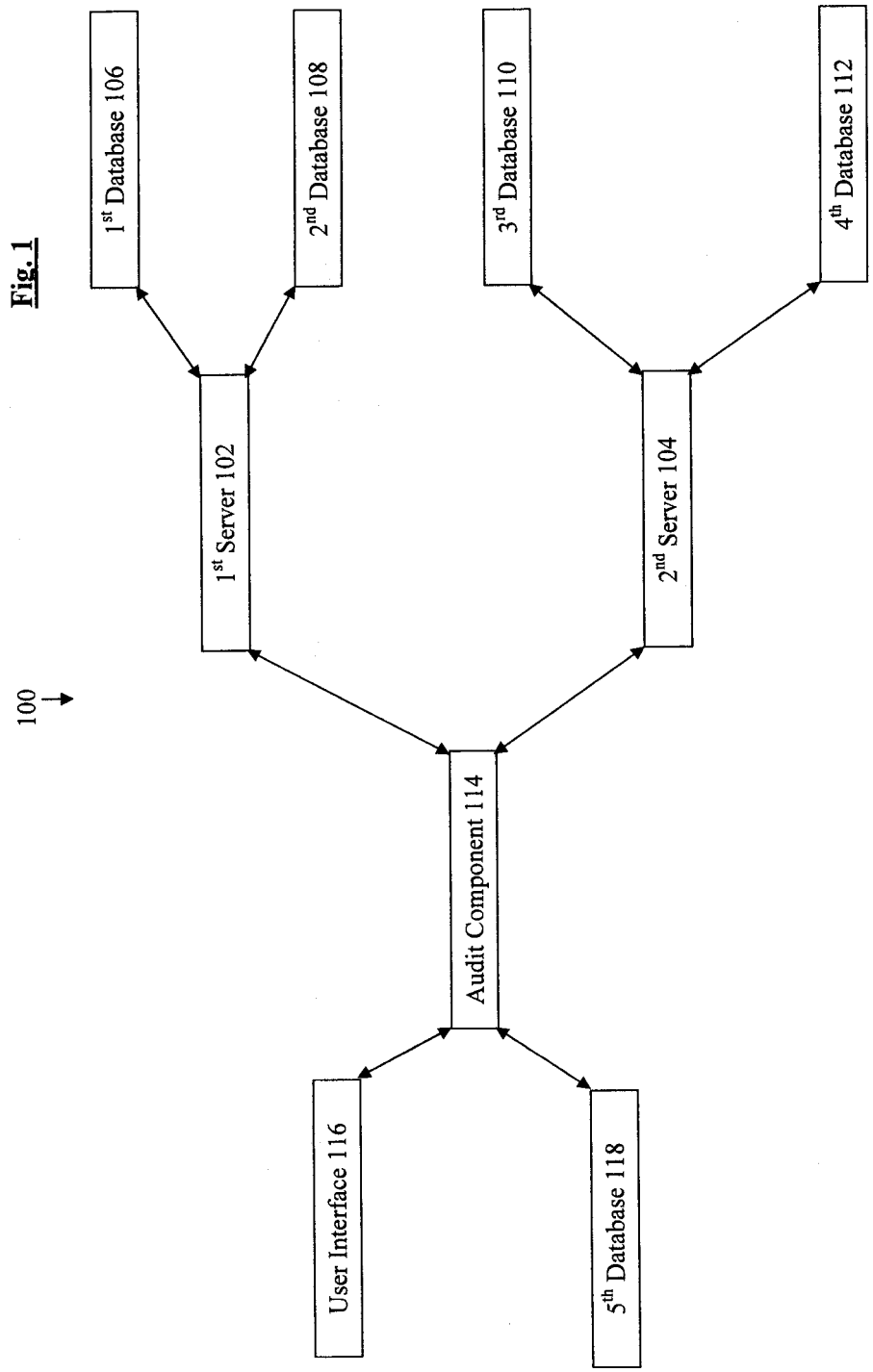
FIG. 1 is a block diagram depicting an embodiment of the system of the present invention.

With reference to FIG. 1, a block diagram depicts the system 100 of the present invention. Although examples in the pending disclosure refer to rates related to travel products and services, the present invention may also be applied to distribution systems related to other types of products and services. At a basic level, the system 100 may include one server, one database, one audit component, and one user interface. The depicted system includes a first server 102, a second server 104, a first database 106, a second database 108, a third database 110, and a fourth database 112. Although FIG. 1 depicts two servers 102-104 and four databases 106-112, the system 100 may include any number of servers 102-104 and any number of databases 106-112. Each of the servers 102-104 may be a global distribution system associated with products and/or services. Each of the databases 106-112 may be a remote database for a computer reservation system indirectly accessed by the servers 102-104, wherein each computer reservation system is associated with products and/or services. Each of the databases 106-112 may also be a local database accessed directly by one of the servers 102-104, such as a global distribution system database. Each of the databases 106-112 may communicate exclusively with one of the servers 102-104. For example, the databases 106-108 may communicate only with the first server 102 while the databases 110-112 may communicate only with the second server 104. Alternatively, some of the databases 106-112 may communicate with more than one of the servers 102-104. For example, the second database 108 may communicate with both of the servers 102-104. The system 100 may include switches (not depicted in FIG. 1) which convert communications in a server format from the servers 102-104 into communications in a database format for the databases 106-112 and convert communications in a database format from the databases 106-112 into communications in a server format for the servers 102-104.

The system 100 also includes an audit component 114, a user interface 116, and a fifth database 118. The system 100 may execute the audit component to conduct reverse audits of data via the servers 102-104 and the databases 106-112, output results of such a reverse audit via the user interface 116, and store results of such a reverse audit in the fifth database 118.

Figure 2:
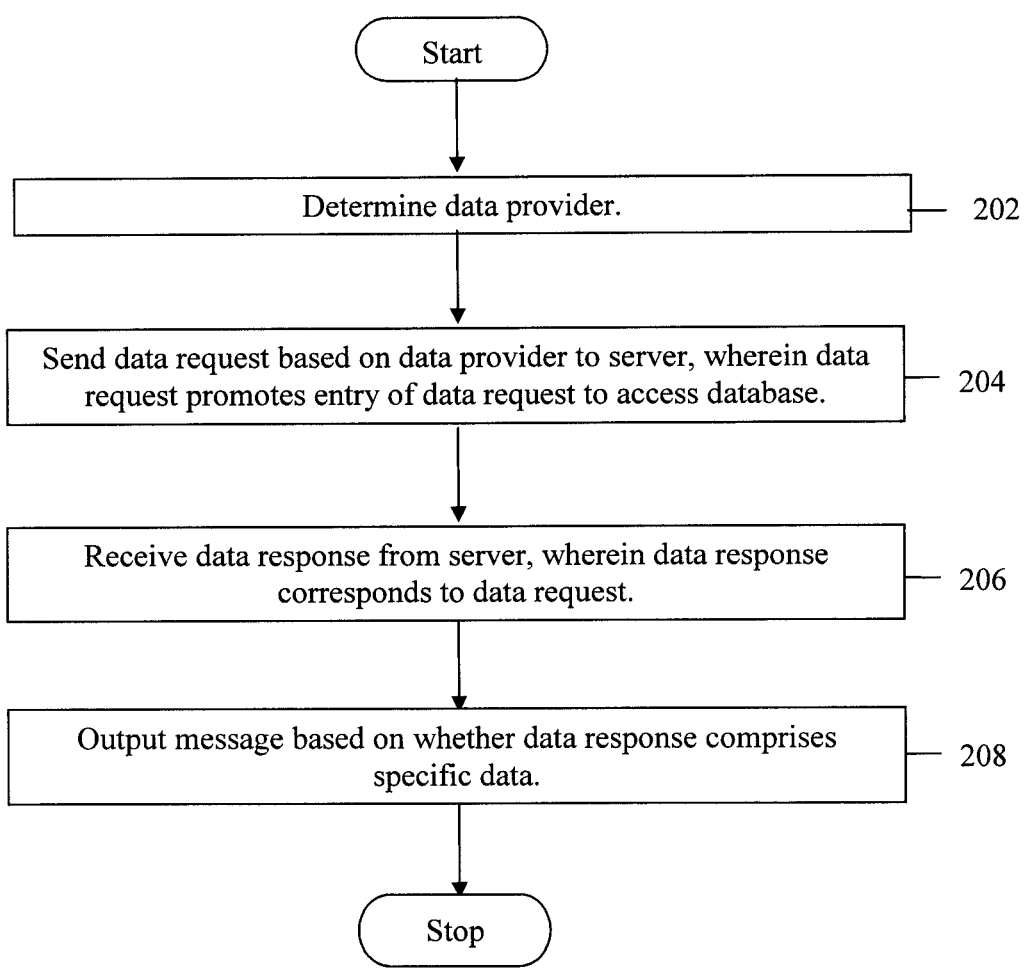
FIG. 2 is a flowchart depicting an embodiment of the process of the present invention.

With reference to FIG. 2, a flowchart is depicted of the process 200 of the present invention. The process 200 may be implemented by the system 100, a method of the present invention, or a computer program product of the present invention.

In box 202, a data provider is determined. For example, the audit component 114 may identify two New York hotels as data providers. In some embodiments, the audit component 114 may prompt a user of the system 100 to determine the data provider. For example, the audit component 114 may prompt the user to enter identifiers for each New York hotel which the user desires to audit. The user may identify hotels which offer rates approved by a corporation, and/or may identify hotels that are not approved by the corporation. For instance, a user may want to reverse audit an unapproved hotel that is rumored to be offering a rate in the corporation's name even though the corporation did not approve the rate.

In some embodiments, the audit component 114 provides a user with a data form, such as a request for proposal form, and parses the data provider and the status of the data provider from the data form. The status may indicate that a data provider's rates are approved by a specific customer or unapproved by the specific customer. In this manner, the audit component 114 may facilitate rate negotiations between, for example, a corporation and a hotel, and extract the data provider and the data provider's status from a completed data form. The data providers may include a data provider approved by a specific customer and/or a data provider unapproved by the specific customer. For example, the requests for proposal may be parsed to identify two New York hotels whose rates are approved by the corporation and one New York hotel whose rates the corporation did not approve.

In some embodiments, the audit component 114 may determine a data provider based on whether the data provider is within a specified distance from a geographic location. For example, the audit component 114 may identify each New York hotel within five miles of a specified New York airport. The specified distance and/or the geographic location may be selectable by a user. For example, a user of the system 100 may input parameters via the user interface 116 to identify each Chicago hotel within ten miles of a selected Chicago airport. Determining multiple data providers may be based on whether the data providers are within a specified distance from a geographic location that is based on geographic locations associated with a customer or an event. For example, a hotel that is hosting a conference may not offer a corporate discount for a corporation's employees. The audit component 114 may prompt a representative of the corporation to identify the conference-hosting hotel as a central geographic location. In response, the audit component 114 may select hotels that are within five miles of the conference-hosting hotel's central geographic location. In another example, corporation may have three corporate offices in New York. The audit component 114 may prompt a representative of the corporation to identify all of the hotels that are within fifty miles of the geographic center of the three corporate offices. The identified hotels may include hotels that are optimal for hosting corporate visitors who visit any of the three corporate offices. As one skilled in the art will recognize, the audit component 114 may determine a data provider in a number of ways including, but not limited to, user determination, parsing forms, identifying providers within a specific geographic area, and/or any other method for determining a data provider.

The audit component 114 may also store the data provider and the status of the data provider in the fifth database 118, which may be a data provider database, and/or in any of the other databases 106-112. For example, the audit component 114 may store a list of the two approved New York hotels and the one unapproved New York hotel. Determining multiple data providers may be based on whether the data providers are within a specified distance from a geographic location that is based on geographic locations associated with at least one previous rate request. For example, the fifth database 118 may store a list of 250 New York hotels and their associated data responses based on a corporate representative's 50 previous requests. The audit component 114 may determine the geographic center of the 250 New York hotels' geographic locations, and prompt the corporate representative with an option to select the 250 New York hotels, which are each within 75 miles of the determined geographic center. The corporate representative may appreciate such an option because the associated expenses for sending a single data request for the 250 hotels may be significantly less expensive than the associated expenses for sending 50 data requests for the 250 hotels. Although the pending application may generally refer to the first database 106 and the third database 110, in some examples the first database 106 may be referred to as a remote database 106 and the third database 110 may be referred to as a local database 110.

In box 204, a data request is sent to a server, wherein the data request promotes entry of the data request to access a database. For example, the audit component 114 sends a rate request for the three New York hotels during January to the first server 102, wherein the rate request includes extensible markup language (XML) code that emulates a manual entry of a web service request of the rate request when executed by the first server 102. Although the pending application may use a request for a rate as an example, the present invention may request and receive other types of data other than rates. As used herein, a rate may include a price, a cost, a fare, a fee, or a similar value. A rate may be a historic rate, an increasing rate, a decreasing rate, an algorithmic rate, a discounted rate, a negotiated rate, a promotional rate, a seasonal rate, and/or a rate based on certain indices. For example, a New York hotel may offer a discounted rate to a corporation's employees based upon the number of employees that have requested a room and/or the reservation frequency associated with the employees. Although the pending application may use a corporation and its employees as an example, the present invention may send and receive requests related to any type of customer, such as an affiliate of the corporation. If the audit component is to send data requests to both of the servers 102-104, the audit component 114 may send the data requests to the servers 102-104 consecutively (in serial) or concurrently or simultaneously (in parallel).

The data request may be based on a specific customer. For example, the data request may request rates from all hotels in a geographic area that list rates for a specific corporation. The data request may be initiated on behalf of a specific customer and/or a data provider. For example, the audit component 114 may conduct a reverse audit on behalf of a specific corporation for all hotels in a geographic area that list rates for the specific corporation. A corporation may be motivated to conduct a reverse audit of the rates its employees are offered by hotels to reduce the chance that corporation's employees accept offers that the corporation did not approve. The corporation's employees may become dissatisfied with the accommodations at the unapproved hotel and/or the corporation may become dissatisfied in reimbursing its employees for hotel rates perceived to be too expensive. In another example, the audit component 114 may conduct a reverse audit on behalf of a specific hotel chain for all the corporations for which the specific hotel chain offers rates. A hotel chain may be motivated to conduct a reverse audit of the rates it offers to corporations to reduce the chance that a corporation reduces future business with the hotel chain due to the hotel chain offering rates to the corporation's employees that the corporation did not approve, and/or to reduce any other risks associated with offering rates that the corporation did not approve.

The data request may include an identifier and/or access information associated with a system user. For example, the rate request may specify each of the corporate identifiers used by a corporation in negotiations to request rates specifically negotiated for the corporation. The audit component 114 may compile the list of corporate identifiers by parsing and extracting each corporate identifier from each of the data request forms associated with the corporation, such as <Lanyon Inc.>, <Lanyon>, and <Lany> for Lanyon Inc. Alternatively, identifiers may be developed or received in any number of methods before being employed in a data request. In another example, the data request may include a password for a corporation to request confidential rates specifically negotiated for the corporation. In yet another example, the rate request may specify each of the identifiers and passwords associated with a hotel chain that owns one of the three New York hotels if the hotel chain is requesting a reverse audit of the rates its hotels are offering.

The data request may specify multiple dates, and the multiple dates may be associated with multiple months. For example, the audit component 114 sends a rate request to verify whether the three New York hotels list rates for the corporation around January $14^{th}$. However, in addition to requesting the three New York hotels' room rates for the corporation on January $14^{th}$, the audit component 114 may also request the three New York hotels' room rates for January $13^{th}$, the day before the specified date, for January $15^{th}$, the day after the specified date, January $7^{th}$, one week before the specified date, and January $21^{st}$, one week after the specified date. Therefore, the audit component 114 may assure a customer that any results of the reverse audit are more representative of the data specified by the three New York hotels for the corporation in January than a statistical anomaly. Furthermore, the audit component 114 may also request rates for other months than the specified month, such as requesting the rates provided by the three New York hotels for the corporation for February $14^{th}$ and March $14^{th}$ as well. Such a seasonal verification may enable a customer to determine whether the rates offered for the specified month are also representative of rates offered for similar months. If the audit component 114 conducts a reverse audit for multiple data providers, the audit component 114 may send multiple data requests to the servers 102-104.

In box 206, a data response is received from a server, wherein the data response corresponds to a data request. For example, the audit component 114 receives a rate response from the first server 102, wherein the rate response corresponds to the rate request and includes a rate offered by the unapproved New York hotel during January to the corporation. The data response may include information associated with a product and/or a service. For example, the rate response may specify that the rate of $100 per night is available to the corporation's employees for a non-smoking room with two double beds on January $14^{th}$. The data response may be based on the identifier and/or the access information associated with the user. For example, the first server 102 may provide the rate response only available for the corporation and may provide the rate response as confidential information that is only accessible when the rate request includes the corporation's access enabling information. If the audit component 114 conducts a reverse audit for multiple data providers, the audit component 114 may receive multiple data responses from the servers 102-104.

In box 208, a message is output based on whether the data response includes specific data. For example, the audit component 114 outputs a message which indicates that the unapproved New York hotel offers a rate for the corporation's employees in January. In another example, the audit component 114 outputs a message which indicates that the first approved New York hotel offers a rate for the corporation's employees in January. In yet another example, the audit component 114 outputs a message which indicates that the second approved New York hotel lacks a rate for the corporation's employees in January. In a further example, the audit component 114 outputs a message which indicates that the unapproved New York hotel lacks a rate for the corporation's employees in February. The audit component 114 may also output a message that indicates that the first approved New York hotel is offering a rate, the second approved New York hotel is not offering a rate, and the unapproved New York hotel is offering a rate.

The audit component 114 may output the message to a data provider, which may be associated with the remote database 106, and/or a specific customer. For example, the audit component 114 may output a message to the corporation indicating that the reverse audit indicates that the unapproved New York hotel offers a rate for the corporation's employees for January $14^{th}$. In another example, the audit component 114 outputs a message to the unapproved New York hotel specifying that the rate offered to the corporation's employees for January $14^{th}$ is not approved by the corporation. In response to receipt of such messages, the corporation and/or the hotel may initiate appropriate actions, such as the corporation informing their employees that the unapproved New York hotel is offering an unapproved rate or contacting the new York hotel about the unapproved rate, or the New York hotel taking corrective measures to remove the unapproved rate from the remote database 106.

The audit component 114 may also send the data request to the servers 102-104, receive the data response from the servers 102-104, and output a report based on receiving the data response from servers 102-104. For example, the audit component 114 may output a comprehensive report for the corporation based on sending and receiving requests via the servers 102-104 and the databases 106-112 to confirm whether each hotel with which the corporation has negotiated a rate offers a rate. The audit component 114 may include separate components for communicating with each of the servers 102-104, such as a first dedicated component for communicating with the first server 102 and a second dedicated component for communicating with the second server 104.

The report may include any information related to the expected offering of rates, the unexpected offering of rates, the expected absence of rates, the unexpected absence of rates, statistics, and or other inaccuracies identified in a reverse audit conducted via one or more of the servers 102-104. Although each of the servers 102-104 may respond with data in different formats, the audit component 114 may provide the report in a standardized format that does not differentiate between the different data formats provided by the servers 102-104. The report may be output in the form of a printed report, web access to the report, graphs, real-time information, raw data, batch information, and/or similar types of reports. The audit component 114 may output the report in a format that enables a system user to modify, filter, and/or delete data in the report, query the data in the report, extract data from the report, and convey the report and/or extracted data to various user interface screens and/or webpages. Furthermore, access to portions of the report and/or extracted data may be available to various users based on corresponding security levels associated with the users, thereby requiring the users to enter access enabling information, such as usernames and passwords.

The audit component 114 may enable a user to customize the report and/or the message. For example, the audit component 114 may enable a customer to specify the format of data in the report, such as which data is provided, where it is located on the report, and how each instance of data is described. Furthermore, the audit component 114 may enable a customer to specify how data in the reports may be formatted for storage.

The audit component 114 may also store the data response and/or the report as historical data in the fifth database 118, and compare any current data with historical data in the fifth database 118. For example, the current data may indicate that the unapproved New York hotel offers a rate to the corporation's employees for January, and the historical data may indicate that the unapproved New York hotel also offered a rate to the corporation's employees for December that was not approved. This information may be conveyed to a data provider for useful analysis or a specific customer may review its historical data to determine which data providers are more likely to load unapproved data.

The audit component 114 may also send corrective data to the first server 102. For example, the audit component 114 may determine that the remote database 106 identifies a rate offered by the unapproved New York hotel to the corporation's employee for January. In this situation, the unapproved New York hotel may allow the audit component 114 to update the remote database 106 to delete the unapproved rate.

The audit component 114 may also enable a system user to schedule the audit component 114 to execute on a scheduled basis. For example, a system user may schedule the audit component 114 to execute on the next Friday or the first Monday of each month.

The invention being thus described, it will be obvious that the same may be varied in many ways. Such variations are not to be regarded as a departure from the spirit and scope of the invention and all such modifications as would be obvious to one skilled in the art are intended to be included within the scope of the system, method, or computer program product described.

The invention claimed:

1. A system for data audits, the system comprising:
   a processor;
   a memory; and
   an audit component stored in the memory, wherein said audit component is executed by said processor to:
   a) determine a data provider;
   b) send a request for data regarding at least one customer to a database through a server, wherein said data request promotes an entry of said data request to access said database, and wherein said data request is based on said data provider;
   c) receive a data response from said server, wherein said data response corresponds to said data request;
   d) determine an approval status of said data provider, wherein said determination of said approval status comprises comparing said data provider to an approval database comprising data providers approved by said customer to determine whether said data provider is at least one of an approved data provider and an unapproved data provider;
   e) determine an indicated approval status, wherein said determination of said indicated approval status comprises an analysis of whether said data response comprises specific data indicating that said data provider is an approved data provider;
   f) compare said approval status of said data provider to said indicated approval status to determine an audited approval status for said data provider; and
   g) create a message based on said audited approval status for said data provider.

2. A method for data audits, the method comprising:
   a) determining a data provider;
   b) sending a request for data regarding at least one customer to a database through a server, wherein said data request promotes an entry of said data request to access said database, and wherein said data request is based on said data provider;
   c) receiving a data response from said server, wherein said data response corresponds to said data request;
   d) determining an approval status for said customer, wherein said determination comprises comparing said customer to an approval database comprising at least one customer that has approved said data provider to determine whether said customer is at least one of a customer that has approved said data provider and a customer that has not approved said data provider;
   e) determining an indicated approval status, wherein said determination of said indicated approval status comprises an analysis of whether said data response comprises specific data indicating that said data provider is approved by said at least one customer;
   f) comparing said approval status of said customer to said indicated approval status to determine an audited approval status for said at least one customer;
   and
   g) creating a message based on said audited approval status for said at least one customer.

3. A computer program product for rate audits, the computer program product comprising:
   a computer readable storage medium storing computer executable program code that, when executed by a processor, causes said computer executable program code to perform a method comprising:
a) determining a plurality of rate providers;
b) sending a rate request for at least one customer to a database through a server, wherein said rate request promotes an entry of said rate request to access a database, and wherein said rate request is based on said plurality of rate providers;
c) receiving a rate response from said server, wherein said rate response corresponds to said rate request;
d) determining an approval status for each of said plurality of rate providers, wherein said determination comprises comparing said plurality of rate providers to an approval database comprising rate providers approved by said customer to determine for each of said plurality of rate providers whether said rate provider is at least one of an approved rate provider and an unapproved rate provider;
e) determining an indicated approval status for each of said plurality of rate providers, wherein said determination of said indicated approval status comprises an analysis of whether said rate response comprises specific data for each of said plurality of rate providers indicating that said rate provider is approved by said customer;
f) comparing said approval status for each of said plurality of rate providers to said indicated approval status for each of said plurality of rate providers to determine an audited approval status for each of said plurality of rate providers; and
g) creating a message based on said audited approval status for each of said plurality of rate providers.

4. The system of claim 1 wherein determining said data provider is based on determining whether said data provider is within a specified distance from a geographic location.

5. The system of claim 4 wherein at least one of said specified distance and said geographic location is selectable by a user.

6. The system of claim 4 wherein said geographic location is selected based on one of a plurality of geographic locations associated with a customer, a plurality of geographic locations associated with an event location, and a plurality of geographic locations associated with at least one previous data request.

7. The system of claim 1 wherein determining said data provider comprises prompting a user to identify said data provider.

8. The system of claim 1, wherein determining said data provider comprises:
a) Providing a user with a data form; and
b) Parsing said data provider from said data form to determine a status associated with said data provider.

9. The system of claim 8, further comprising storing at least one of said data provider and said status in said approval database.

10. The system of claim 8, wherein said data form comprises a request for proposal form.

11. The system of claim 1 wherein said data provider comprises a plurality of data providers, said data request comprises a plurality of data requests, and said data response comprises a plurality of data responses.

12. The system of claim 1 wherein said data provider comprises a rate provider, said data request comprises a rate request, and said data response comprises a rate response.

13. The system of claim 1 wherein said database comprises a plurality of databases.

14. The system of claim 1 wherein said data request comprises code that emulates a manual entry of a web service request when executed by said server.

15. The system of claim 14 wherein said code comprises extensible markup language (XML) code.

16. The system of claim 1 wherein said data response comprises a description of at least one of a product, a service, a travel package, a hotel reservation, a rental car reservation, an airline reservation, a train reservation, a bus reservation, and a cruise reservation.

17. The system of claim 1 wherein said server comprises a global distribution system associated with at least one of products, services, travel services, hospitality services, shipping services, trucking services, parcel delivery services, healthcare providers, and energy providers.

18. The system of claim 1 wherein said database comprises at least one database accessed directly by said server.

19. The system of claim 1 wherein said database is associated with a computer reservation system that is associated with at least one of travel packages, hotel reservations, rental car reservations, airline reservations, train reservations, bus reservations, and cruise reservations.

20. The system of claim 1 wherein said audit component is further executed by said processor to enable a system user to schedule said audit component to execute on a scheduled basis.

21. The method of claim 2 wherein determining said data provider is based on determining whether said data provider is within a specified distance from a geographic location.

22. The method of claim 2 wherein said geographic location is selected based on one of a plurality of geographic locations associated with a customer, a plurality of geographic locations associated with an event location, and a plurality of geographic locations associated with at least one previous data request.

23. The method of claim 2 wherein said data request comprises an identifier associated with a system user, and wherein said data response is based on said identifier.

24. The method of claim 23 wherein said identifier enables said data response to comprise information associated with at least one of products, services, travel packages, hotel reservations, rental car reservations, airline reservations, train reservations, bus reservations, and cruise reservations.

25. The method of claim 2 wherein said data request comprises access information associated with a system user, and wherein said server responds to said data request based on said access information.

26. The method of claim 25 wherein said access information enables said server to respond to said data request with information associated with at least one of products, services, travel packages, hotel reservations, rental car reservations, airline reservations, train reservations, bus reservations, and cruise reservations.

27. The method of claim 2 wherein said data request comprises a request associated with a plurality of dates.

28. The method of claim 27 wherein said plurality of dates are associated with a plurality of months.

29. The computer program product of claim 3 wherein determining said plurality of rate providers is based on determining whether said plurality of rate providers is within a specified distance from a geographic location.

30. The computer program product of claim 29 wherein said geographic location is selected based on one of a plurality of geographic locations associated with a customer, a plurality of geographic locations associated with an event location, and a plurality of geographic locations associated with at least one previous rate request.

31. The computer program product of claim 3 wherein determining said plurality of rate providers comprises prompting a user to identify said plurality of rate providers.

32. The computer program product of claim 3 wherein said rate request is initiated on behalf of at least one of said customer and one of said plurality of rate providers.

33. The computer program product of claim 3 wherein said database comprises a remote database, and wherein outputting said message comprises outputting said message to at least one of a rate provider associated said remote database and a specific customer.

34. The computer program product of claim 3 wherein outputting said message comprises outputting said message to at least one of said customer and one of said plurality of rate providers.

35. The computer program product of claim 3 wherein said method further comprises storing said rate response as historical data in a database.

36. The computer program product of claim 3 wherein said method further comprises:
   a) Sending said rate request to a plurality of servers that comprise said server; and
   b) Receiving said rate response from said plurality of servers.

37. The computer program product of claim 36 wherein outputting said message comprises outputting a report based on receiving said rate response from a combination of said plurality of servers.

38. The computer program product of claim 36 wherein said method further comprises enabling a user to customize said report.

39. The computer program product of claim 36 wherein said method further comprises storing said report as historical data in a database for comparison to subsequent reports.

40. The computer program product of claim 36 wherein said method further comprises comparing said report with historical data in a database.

41. The computer program product of claim 3 wherein said method further comprises enabling a user to customize said message.

42. The computer program product of claim 3 wherein outputting said message comprises sending corrective data to said server based on said rate and at least one of said plurality of rate providers.

43. The system of claim 1 wherein said database comprises at least one remote database accessed indirectly by said server.

* * * * *